United States Patent
Elyasi et al.

(10) Patent No.: US 11,275,510 B2
(45) Date of Patent: Mar. 15, 2022

(54) SYSTEMS AND METHODS FOR STORAGE DEVICE BLOCK-LEVEL FAILURE PREDICTION

(71) Applicant: SAMSUNG ELECTRONICS CO., LTD., Suwon-si (KR)

(72) Inventors: Nima Elyasi, San Jose, CA (US); Changho Choi, San Jose, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 30 days.

(21) Appl. No.: 16/843,823

(22) Filed: Apr. 8, 2020

(65) Prior Publication Data
US 2021/0247912 A1     Aug. 12, 2021

Related U.S. Application Data

(60) Provisional application No. 62/971,773, filed on Feb. 7, 2020.

(51) Int. Cl.
  G06F 3/06        (2006.01)
  G06F 12/02       (2006.01)

(52) U.S. Cl.
  CPC ............ *G06F 3/0616* (2013.01); *G06F 3/064* (2013.01); *G06F 3/0619* (2013.01); *G06F 3/0658* (2013.01); *G06F 3/0679* (2013.01); *G06F 12/0246* (2013.01); *G06F 2212/7211* (2013.01)

(58) Field of Classification Search
  None
  See application file for complete search history.

(56) References Cited

U.S. PATENT DOCUMENTS

| | | |
|---|---|---|
| 2007/0260811 A1 | 11/2007 | Merry, Jr. et al. |
| 2008/0239851 A1 | 10/2008 | Lin |
| 2013/0007358 A1 | 1/2013 | Hu et al. |
| 2014/0040681 A1 | 2/2014 | Wolfman et al. |
| 2014/0258658 A1 | 9/2014 | Best et al. |
| 2015/0113203 A1 | 4/2015 | Dancho et al. |
| 2015/0186055 A1 | 7/2015 | Darragh |
| 2016/0042141 A1 | 2/2016 | Deleris et al. |
| 2017/0068467 A1 | 3/2017 | Rothberg |
| 2017/0277441 A1 | 9/2017 | Gupta et al. |

(Continued)

OTHER PUBLICATIONS

Jun, et al.; Terabyte Sort on FPGA-Accelerated Flash Storage, 2017 IEEE Computer Society 25th Annual International Symposium on Field-Programmable Custom Computing Machines; pp. 1-8, 2017.

(Continued)

*Primary Examiner* — Kevin Verbrugge
(74) *Attorney, Agent, or Firm* — Lewis Roca Rothgerber Christie LLP

(57) ABSTRACT

In a method for dynamic wear-levelling and load redirection in a solid-state drive (SSD) including one or more blocks, the method including: receiving, by a controller, a request to write data; calculating, by the controller, a vulnerability factor of the one or more blocks; selecting, by the controller, a target block from the one or more blocks to receive the request to write data; determining, by the controller, a status of the target block based on the vulnerability factor of the target block; writing, by the controller, the data to the target block based on the status of the target block; and updating, by the controller, a mapping table based on the data written to the target block.

24 Claims, 6 Drawing Sheets

(56) References Cited

U.S. PATENT DOCUMENTS

| | | |
|---|---|---|
| 2018/0181492 A1 | 6/2018 | Gupta et al. |
| 2018/0181758 A1 | 6/2018 | Branco |
| 2018/0232144 A1 | 8/2018 | Pahwa et al. |
| 2018/0332012 A1 | 11/2018 | Koster et al. |
| 2019/0034251 A1 | 1/2019 | Sridharan et al. |
| 2019/0250980 A1 | 8/2019 | Frolikov |
| 2019/0289029 A1 | 9/2019 | Chawla et al. |
| 2020/0050769 A1 | 2/2020 | Bhosale et al. |

OTHER PUBLICATIONS

Mueller, et al.; Sorting Networks on FPGAs, Systems Group, Department of Computer Science; http://www.systems.ethz.ch/; pp. 1-25, 2010.

Muslim, et al.; Efficient FPGA Implementation of OpenCL High-Performance Computing Applications via High-level Synthesis; IEEE Access; vol. 5, 2017; pp. 2747-2762.

Srivastava, et al. and Chen et.al.; A Hybrid Design for High Performance Large-scale Sorting on FPGA; Department of Computer Science, University of Southern California and Ming Hsieh Department of Electrical Engineering, University of Southern California, respectively; 2015 IEEE, pp. 1-6.

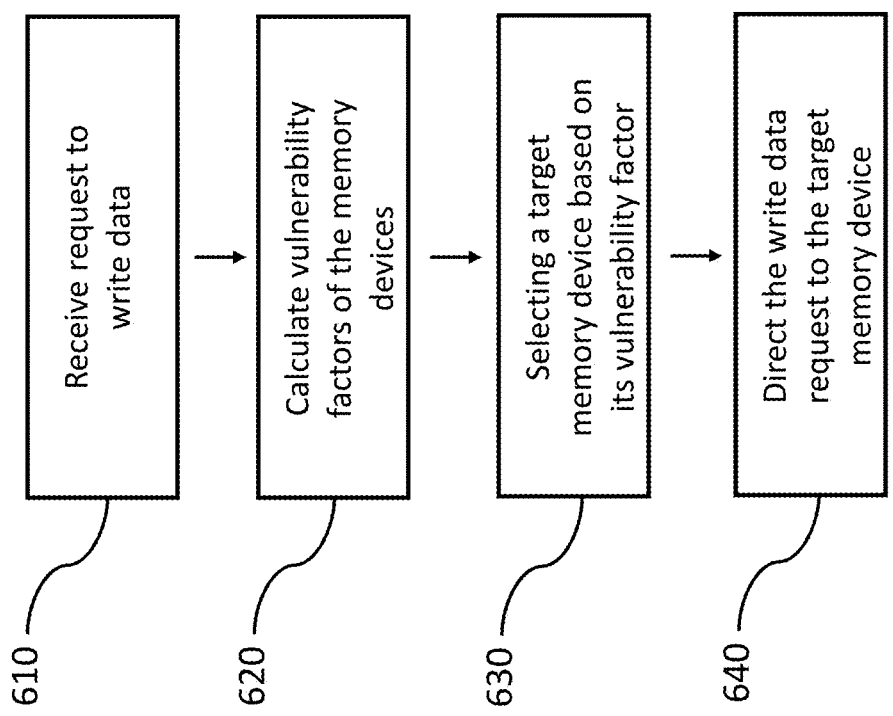

SYSTEMS AND METHODS FOR STORAGE DEVICE BLOCK-LEVEL FAILURE PREDICTION

CROSS-REFERENCE TO RELATED APPLICATION(S)

This application claims priority to and the benefit of U.S. Provisional Patent Application No. 62/971,773 filed Feb. 7, 2020 and entitled "DYNAMIC LOAD REDIRECTION AND WEAR-LEVELING BASED ON SSD BLOCK-LEVEL FAILURE PREDICTION", the entire content of which is incorporated herein by reference. This application is further related to U.S. patent application Ser. No. 16/701,133 filed Dec. 2, 2019, and entitled "FIRMWARE-BASED SSD BLOCK FAILURE PREDICTION AND AVOIDANCE SCHEME", the entire content of which is incorporated herein by reference.

FIELD

One or more aspects of embodiments according to the present disclosure relate to systems and methods for storage device block-level failure prediction.

BACKGROUND

Computer memory systems may include a large number of storage devices such as solid state drives (SSD). Each SSD within the memory system may contain a number of flash chips, where each flash chip contains a number of blocks, and each block contains a number of pages. A page can be several kilobytes and is the smallest unit for reading and writing data to the SSD.

The above information disclosed in this Background section is only for enhancement of understanding of the background of the present disclosure, and therefore, it may contain information that does not form prior art.

SUMMARY

Aspects of embodiments of the present disclosure are directed toward systems and methods for storage device block-level failure prediction.

According to some example embodiments of the present disclosure, in a method for dynamic wear-levelling and load redirection in a solid-state drive (SSD) including one or more blocks, the method including: receiving, by a controller, a request to write data; calculating, by the controller, a vulnerability factor of the one or more blocks; selecting, by the controller, a target block from the one or more blocks to receive the request to write data; determining, by the controller, a status of the target block based on the vulnerability factor of the target block; writing, by the controller, the data to the target block based on the status of the target block; and updating, by the controller, a mapping table based on the data written to the target block.

According to some example embodiments, the method further including writing, by the controller, the data to a replica block when the vulnerability factor of the target block is greater than a predetermined threshold.

According to some example embodiments, the status includes at least one of a healthy status, a vulnerable status, or a retired status.

According to some example embodiments, the mapping table includes a table that maps a logical page number of the data written to the target block to a physical page number of the data written to the target block.

According to some example embodiments, the target block is selected based on the vulnerability factor of the target block.

According to some example embodiments, the target block with a smallest vulnerability factor is selected.

According to some example embodiments, the vulnerability factor is calculated using a first set parameters generated from block level metadata and a second set of parameters generated from drive level metadata.

According to some example embodiments, the block level metadata includes at least one of a read error, a write error, or an erase error.

According to some example embodiments, the drive level metadata includes one or more of a page identification, a block identification, a timestamp, a block-based error, and a drive log data.

According to some example embodiments of the present disclosure, in a solid-state drive (SSD) system including a controller and one or more blocks, wherein the controller is configured to: receive a request to write data; calculate a vulnerability factor of the one or more blocks; select a target block from the one or more blocks to receive the request to write data; determine a status of the target block based on the vulnerability factor of the target block; write the data to the target block based on the status of the target block; and update a mapping table based on the data written to the target block.

According to some example embodiments, the controller is further configured to: write the data to a replica block when the vulnerability factor of the target block is greater than a predetermined threshold.

According to some example embodiments, the status includes at least one of a healthy status, a vulnerable status, and a retired status.

According to some example embodiments, the target block is selected based on the vulnerability factor of the target block.

According to some example embodiments, the target block with a smallest vulnerability factor is selected.

According to some example embodiments, the vulnerability factor is calculated using a first set of parameters generated from block level metadata and a second set of parameters generated from drive level metadata.

According to some example embodiments, the block level metadata includes at least one of a read error, a write error, or an erase error.

According to some example embodiments, the drive level metadata includes one or more of a page identification, a block identification, a timestamp, a block-based error, and a drive log data.

According to some example embodiments of the present disclosure, in a method for dynamic wear-levelling and load redirection within a memory system including one or more memory devices, the method including: receiving, by a controller, a request to write data; calculating, by the controller, a vulnerability factor of the one or more memory devices; selecting, by the controller, a target device from the one or more memory devices to receive the request to write data based on the vulnerability factor of the target device; and directing, by the controller, the request to write data to the target device.

According to some example embodiments, the one or more memory devices include one or more flash chips.

According to some example embodiments, the vulnerability factor of the one or more flash chips is equal to a sum of all blocks within the one or more flash chips.

According to some example embodiments, a flash chip with a smallest vulnerability factor is selected as a target flash chip.

According to some example embodiments, the one or more memory devices include one or more SSDs.

According to some example embodiments, the vulnerability factor of the one or more SSDs is equal to a sum of all flash chips within the one or more SSDs.

According to some example embodiments, an SSD with a smallest vulnerability factor is selected as a target SSD.

BRIEF DESCRIPTION OF THE DRAWINGS

FIG. 6 is a flowchart showing a method for distributing load across memory devices within a memory system, in accordance with example embodiments of the disclosure.

DETAILED DESCRIPTION

Figure 1:
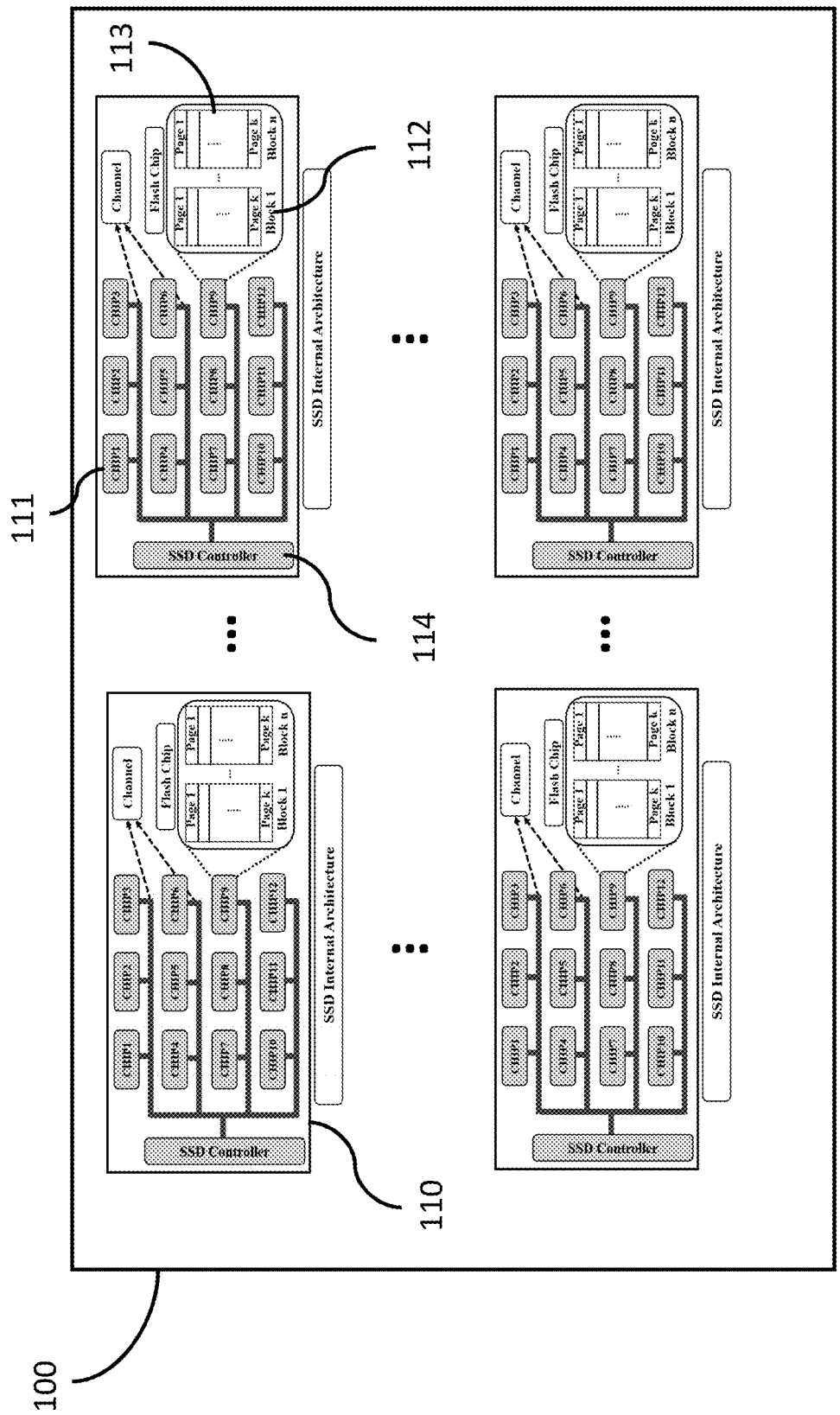
FIG. 1 shows an image of a memory system with multiple storage devices, in accordance with example embodiments of the disclosure.

Over time, the pages within the blocks in the SSD can wear and become prone to failure. SSD failures in the field can lead to a server shutdown and hence impair the performance and availability of the datacenter-scale applications. To reduce and/or prevent such unexpected failures, systems which employ SSDs may use simple threshold-based models to avoid the failure by replacing the drives prior to their failure. Such protection mechanisms may lead to high degrees of false alerts, or may not be able to predict/avoid all the SSD failures. Further, in case of identifying a physical error, the SSD may not be able to recover from that and hence avoid further device failure. Additionally, the frequent errors in the SSD may be caused by a few faulty pages within the SSD.

According to some example embodiments, a memory system may utilize the outcome of a failure prediction module at the block level to redirect and dynamically tune the load across multiple solid stated drive (SSD) devices in the memory system. This approach may extend the lifetime of an SSD and better utilize the available capacity.

According to various embodiments, this disclosure may include a mechanism to proportionally replicate and redirect data (i.e., a load) across blocks within an SSD in a memory system. The mechanism can assign load to blocks according to the vulnerability factor of the blocks. The vulnerability factor can represent the probability that a block may fail, which can be calculated using a failure prediction module. By way of example, a block with a lower vulnerability factor may be less likely to fail while a block with a higher vulnerability factor is more likely to fail. In some embodiments, the load can be targeted to blocks with lower vulnerability factors. In some embodiments, data that is written to a block with a higher vulnerability factor (i.e. a block with a vulnerability factor greater than a predetermined threshold) can be replicated on another block to prevent loss of data in future failures. After writing the data, the corresponding mapping tables can be updated, which may include a logical page number (LPN) to physical page number (PPN) table (i.e. a LTP table) and a PPN to LPN table (i.e. a PTL table).

According to various embodiments, this disclosure is also directed toward a mechanism for assigning load across flash chips within a SSD and across SSDs within a memory system (e.g., a wear-leveling algorithm). A flash chip can have a vulnerability factor that is defined as the sum of the vulnerability factors of each block within the flash chip. The load can be distributed to the flash chips according to the vulnerability factors of the flash chips. For example, the load can be directed to the flash chips with vulnerability factors that fall within a predetermined range. Similarly, a SSD can have a vulnerability factor that is defined as the sum of the vulnerability factors of each flash chip within the SSD. The load can be distributed to the SSDs according the vulnerability factors of the SSDs. For example, the load can be directed to the SSDs with vulnerability factors that fall within a predetermined range.

The disclosed embodiments can help reduce the wear on more vulnerable blocks and increase the lifespan of blocks and SSDs. Additionally, the disclosed embodiments can provide the following advantages:

Assigning load to each SSD drive based on its vulnerability factor

Assigning load to each SSD drive based on the number of predicted "as failed" blocks Assigning load to each SSD drive based on the confidence of prediction module Improving the device lifetime and reliability for better use of it when device identified/predicted as vulnerable FIG. 1 shows an image of a memory system with multiple storage devices, in accordance with example embodiments of the disclosure.

According to FIG. 1, the memory system 100 can include a number of storage devices 110. In some embodiments, the storage devices 110 may include SSDs 110. As shown in FIG. 1, the SSDs 110 can have multiple levels of storage. By way of example, each SSD 110 includes multiple flash chips 111, each flash chip 111 contains a number of blocks 112, and each block contains a number of pages 113. The pages 113 can be several kilobytes and can be the smallest unit for reading and writing data to the SSD 110.

In some embodiments, the SSD 110 may include an embedded controller 114 (e.g., a field programmable gate array (FPGA), application specific integrated circuit (ASIC), processor, etc.). In other embodiments, the controller 114 may be external to the SSD 110. The SSD controller 114 can include the logic circuits to service read and write requests, run wear-levelling algorithms, and run error recovery procedures. In some embodiments, the processes executed by the SSD controller 114 may be implemented using any suitable firmware (i.e. an application-specific integrated circuit). Further, page 113 can include Error Correction Code (ECC) metadata that the SSD controller 114 uses to recover and fix a limited number of bit errors.

According to an embodiment, the controller 114 can send a request to a block 112 within a chip 111. The request may be to read data stored in a page 113 within a block 112 (i.e., a read request) or the request may be to write new data on a page 113 within a block 112 (i.e., a write request). If a request targets a faulty page 112 within a block 112, the request may frequently fail. Further, if the number of bit errors due to hardware failure exceeds a certain number (e.g., a threshold number), the SSD controller 114 may not be able to correct the bit errors and may provide corrupted data to a host.

After a certain number of repeated failures, the system administrator may choose to replace the SSD 110 within the memory system 100, which can increase the cost of running and maintain the memory system 100, and may also impair the performance and availability of the applications due to a consequent server shutdown. On the other hand, when writing to a page 113 (i.e. program operation), if an error occurs, the page 113 can be marked as failed and may not be used anymore. Once a certain number of pages 113 in a block 112 are determined to be failed, the entire block 112 is retired. SSDs 110 can reserve some spare blocks 112 to replace such withdrawn blocks 112. If the SSD 110 runs short on the number available spare blocks (e.g., more than 90% of spare blocks used), the SSD 110 may need to be replaced.

In some embodiments, instead of replacing the SSD 110, a fine-grained block failure prediction could retire the fault blocks early in time to prevent future failures. However, predicting fine-grained errors at the block level is not viable. The process for predicting block level errors may need relatively large amounts of history data for individual blocks within the SSD. Because an SSD can have hundreds of thousands of blocks, the process may require processing and analyzing large datasets inside the SSD. This may be problematic because SSDs have limited computation and processing capabilities. Additionally, storing the datasets can take up valuable storage space on a SSD.

In some embodiments, a block failure prediction method can be used to identified blocks 112 that are likely to fail and retire those blocks 112 to prevent future errors. To this end, the disclosed systems include a firmware-level failure prediction technique that leverages the locality in physical errors, and combines the block-level and device-level information to generate a set of parameters/predictors and feed it to the prediction module which runs a machine learning (ML) module to predict the failure. Based on the output of prediction module, the block 112 can be retired if the block 112 is identified as future failure.

Figure 2:
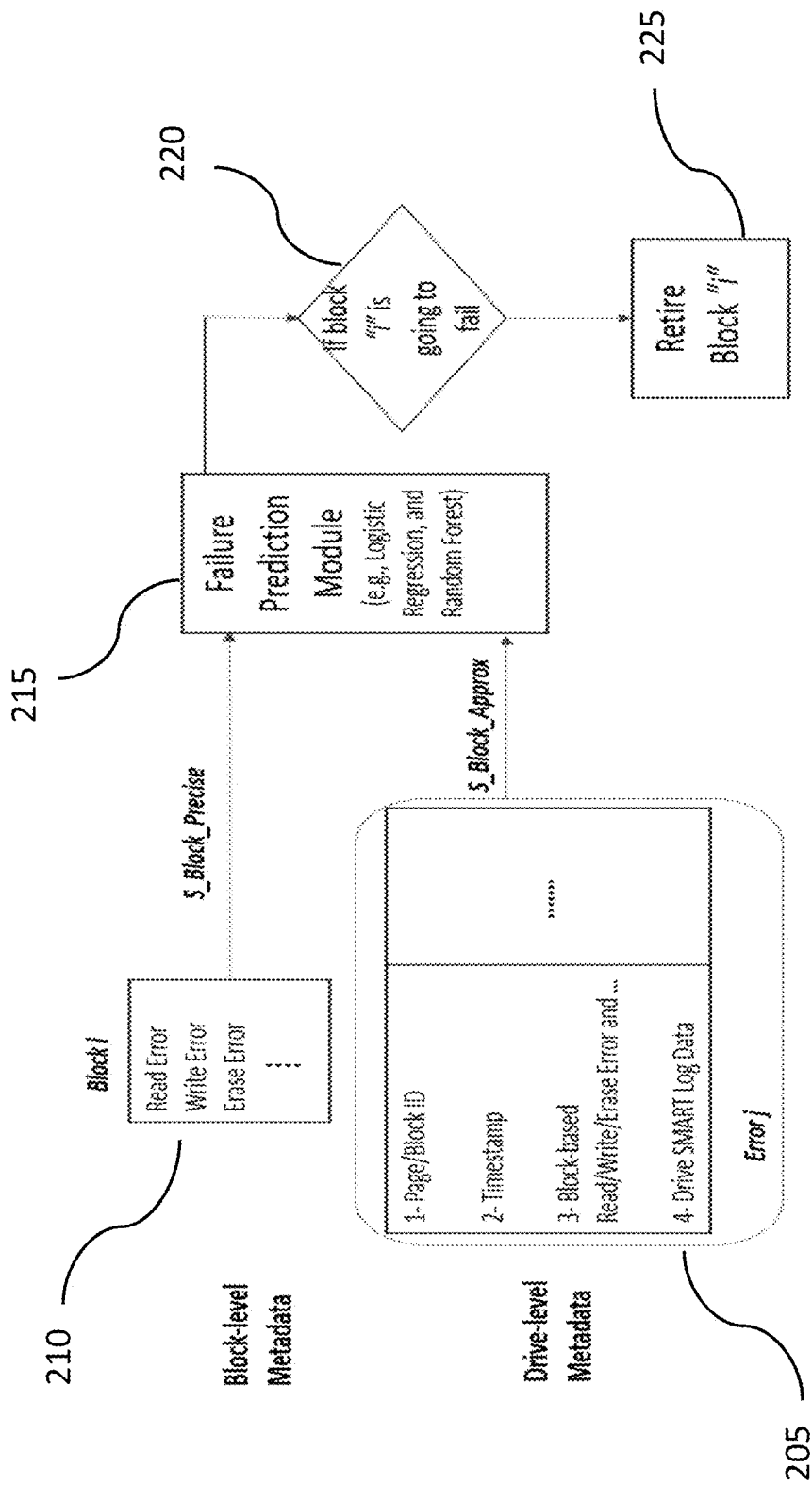
FIG. 2 shows a flowchart for a method of predicting whether a block within an SSD will fail, in accordance with example embodiments of the disclosure.

FIG. 2 shows a flowchart for a method of predicting whether a block within an SSD will fail, in accordance with example embodiments of the disclosure. According to some example embodiments, the number and order of operations illustrated in FIG. 2 may vary. For example, according to some example embodiments, there may be fewer or additional operations, unless otherwise stated or implied to the contrary. Additionally, the order of the operations may vary, unless otherwise stated or implied to the contrary. In some embodiments, the operations illustrated in FIG. 2 may be implemented using any suitable firmware.

Referring to FIG. 2, block level data can be extracted from the available drive-based log data to build a set of parameters (i.e. block level parameters) for a suspected block at 210. The suspected block may be a block that is frequently failing and is likely to fail in the future. In some examples, the extracted block level data may include a read error, write error, or an erase error. In some embodiments, the block level parameters may provide a precise measurement of the suspected block conditions because the parameters are based on data extracted directly from the suspected block. In 205, the disclosed systems may also extract SSD-level data to generate another set of parameters (i.e. drive level parameters) for the suspected block. The extracted SSD-level data can include page/block identification (i.e. ID), timestamp, block-based read/write/erase error, and drive log data. In some embodiments, the drive level parameters may provide an approximate measurement of the suspected block conditions because the drive level parameters are derived from SSD level data that may be averaged across all blocks in the SSD. The block level parameters and drive level parameters generated in 210 and 205 are transferred to a failure prediction module. In 215, the failure prediction module can run a machine learning (ML) module that uses the block level parameters and drive level parameters to determine the probability that the block will fail (i.e. the vulnerability factor of the block). The ML module may use logistic regression and random forest, but is not limited thereto. In 220, the controller determines whether the block is going to fail by comparing the vulnerability factor calculated by the failure prediction module to a predetermined threshold. If the vulnerability factor is greater than the threshold, then the block is predicted that it is going to fail, and the block will no longer be used (i.e. retired block) in 225. If the probability is less than or equal to the threshold, then the block is predicted that it is not going to fail, and the block can continue to be used.

However, retiring the vulnerable blocks based on a threshold may not be efficient. Retiring the block may prevent any further use of the vulnerable block and, in the case of a wrong prediction, retiring the block can lead to a wastage of capacity.

Instead of simply retiring vulnerable blocks, such blocks can still be used by assigning workload to them that is proportional to their vulnerability factors. To this end, vulnerability factors can be used to categorize blocks within an SSD (i.e. status). For example, the statuses may include, but are not limited to, healthy, vulnerable or retired. A block with a vulnerability factor of zero is not predicted as failing in the future by the failure prediction module and may be identified as a healthy block (i.e. a healthy status). A block with a vulnerability factor of one has either reached the end of the P/E cycles lifetime, or has a certain number of pages already failed and may be identified as a retired block (i.e. a retired status). A block with a vulnerability factor between zero and one is predicted as failed by the failure prediction module and can be identified as vulnerable (i.e. a vulnerable status). The vulnerability factor can also be defined as follows:

$$\text{Vulnerability\_Factor} = \begin{cases} 0 & \text{if block is normal} \\ \text{Prob Failure} & \text{if identified as vulnerable} \\ 1 & \text{if already failed/retired} \end{cases}$$

In various embodiments, the workload can be assigned to blocks based on the vulnerability factors of the blocks (e.g., via a wear levelling algorithm). In various embodiments, those blocks with lower vulnerability factors, and thus, less likely to fail, can be targeted first. Additionally, the vulnerability factor can be used to determine whether to use a particular block for write requests. A vulnerable block with a higher probability of failure may not be ideal for write requests because the data can be lost in a future failure. This approach can implicitly reduce usage of more vulnerable blocks. In some embodiments, if data is written to a vulnerable block with a vulnerability factor greater than a predetermined threshold, then the data can also be written to a replica block. Replication can help to prevent loss of data from a future failure of the vulnerable block. Further, the vulnerability factor can be used to determine how much of the vulnerable block content to be replicated. This approach can create a more efficient replication mechanism by limiting the amount of space needed for replication on the replica block. By limiting the amount of data to be replicated from the vulnerable block, the replica block may be used less than if the entire content of the vulnerable block were replicated. Therefore, less use of the replica block can reduce its wear.

Figure 3:
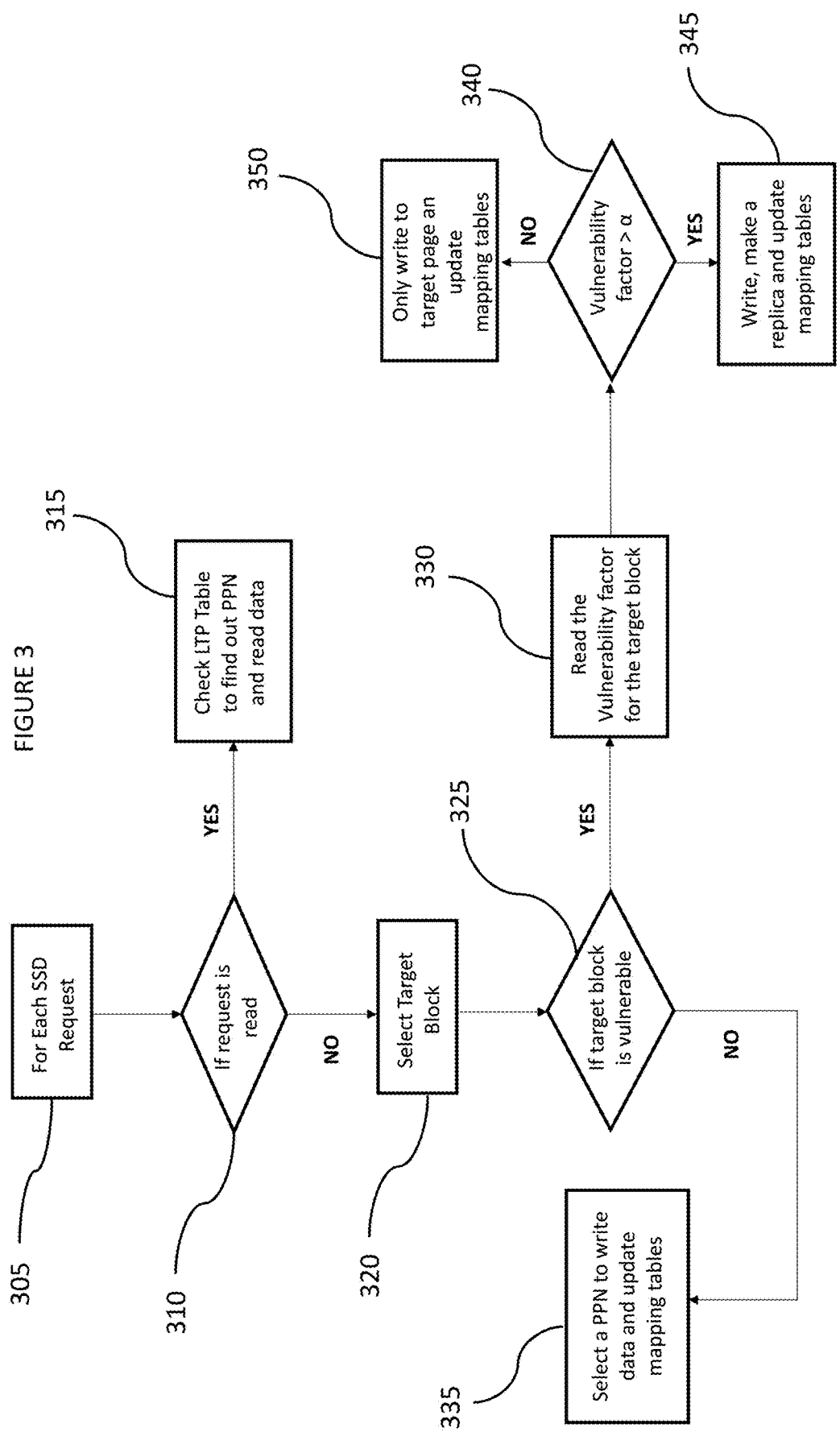
FIG. 3 is a flowchart showing a method for distributing load across blocks within an SSD, in accordance with example embodiments of the disclosure.

FIG. 3 is a flowchart showing a method for distributing load across blocks within an SSD, in accordance with example embodiments of the disclosure. According to some example embodiments, the number and order of operations illustrated in FIG. 3 may vary. For example, according to some example embodiments, there may be fewer or additional operations, unless otherwise stated or implied to the contrary. Additionally, the order of the operations may vary, unless otherwise stated or implied to the contrary. In some embodiments, the operations illustrated in FIG. 3 may be implemented using any suitable firmware.

Referring to FIG. 3, at 305, the SSD receives a request. The request may be a read request or a write request. In 310, the request is determined whether to be a read request. If the request is a read request, the method proceeds to 315. In 315, the LTP table is reviewed to identify the PPN of the data and the data at the PPN is read. In some embodiments, the requested data may be stored on more than one block. For example, the data may be stored on the original block and on any replica blocks. As such, an LPN may correspond to more than one PPN. If the data is corrupted on the original block, the data can still be recovered on the replica block.

If the request is determined not to be a read request in 310, then the method can proceed to 320. In 320, a block can be selected to receive the data (i.e. target block). In some embodiments, the target block may be selected according to its vulnerability factor. For example, the block with the smallest vulnerability factor may be selected as the target block. The target block is determined whether to be vulnerable in 325. A vulnerable block can include a block with a vulnerability factor greater than zero but less than one. If the status of the target block is not vulnerable, then the method can proceed to 335. In 335, a PPN of the target block can be selected to write data and the mapping tables (i.e. the LTP table or the PTL table) can be updated.

If the target block is determined to be vulnerable in 325, then the method can proceed to 330. In 330, the vulnerability factor for the target block can be determined and the method can proceed to 340. In 340, the vulnerability factor of the target block can be compared to a predetermined threshold. If the vulnerability factor is greater than the predetermined threshold, then the process can proceed to 345. In 345, a PPN of the target block can be selected and the data can be written at the selected PPN. A replica of the data can also be written on a replica block and the mapping tables can be updated. If the vulnerability factor is less than or equal to the predetermined threshold in 340, then the method can proceed to 350. In 350, a PPN of the target block can be selected and the data can be written to the selected PPN without replication. The mapping tables can also be updated.

Figure 4:
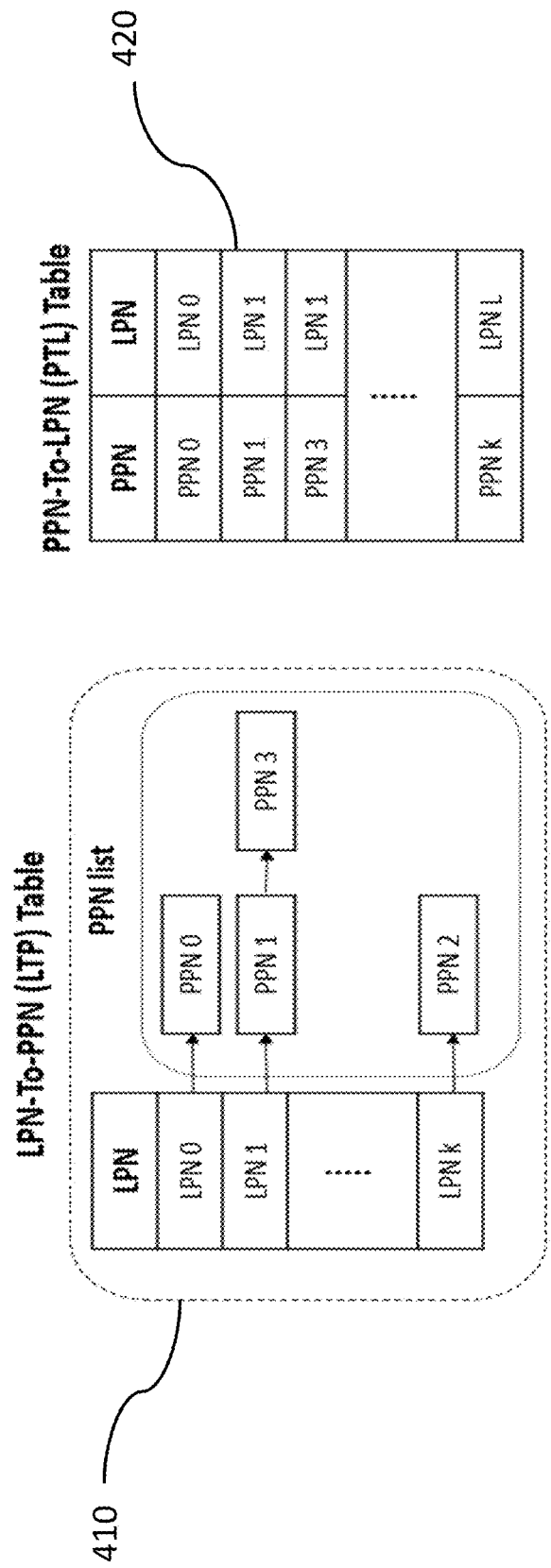
FIG. 4 displays a LTP table and a PTL table in accordance with example embodiments of the disclosure.

FIG. 4 displays a LTP table and a PTL table in accordance with example embodiments of the disclosure.

Referring to FIG. 4, an SSD can have two mapping tables: a LTP table 410 and a PTL table 420. The LTP table 410 maps logical page numbers to physical page numbers. As shown in the LTP table 410, each LPN corresponds to a PPN. By way of example, LPN 0 corresponds to PPN 0. In some embodiments, data may be replicated and may be stored at multiple PPNs: one PPN at the original block and additional PPNs on replica blocks. Thus, a LPN may correspond to more than one PPN. For example, LPN 1 corresponds to PPN 1 and PPN 3 because the data at PPN 1 was replicated at PPN 3.

According to FIG. 4, the PTL table 420 maps physical page numbers (PPN) to logical page numbers (LPN). As shown in the PTL table 420, each PPN corresponds to an LPN. By way of example, PPN 0 corresponds to LPN 0. In some embodiments, more than one PPNs may correspond to the same LPN. For example, PPN 1 and PPN 3 both correspond to LPN 1 because the data at PPN 1 was replicated at PPN 3. In both the LTP table 410 and the PTL table 420, the list of PPNs for a given LPN are maintained.

During a read request, the PPN of the requested data can be retrieved by accessing the LTP table 410. Using the PPN, the requested data is accessed and read. In some embodiments, the data at the original PPN may be corrupted and the data can be retrieved from the replica PPN. During a write request, a PPN is selected for writing the data. The new entry is added to the LTP table 410. If replication of the data is required, the replica PPN is also added to the same entry of LTP table for the corresponding LPN. By way of example, the LPN 1 of the LTP table 410 corresponds to PPN 1 and PPN 3, because the data at PPN 1 was replicated at PPN 3. When updating the LPN, the corresponding PPNs can be invalidated on the LTP table 410. During garbage collection, if a PPN is moved, its corresponding LPN is located from the PTL table 420. Subsequently, the PPN list for the corresponding LPN can be updated in the LTP table 410.

In addition to identifying vulnerability factors of blocks, vulnerability factors can also be determined at the flash chip level (e.g., chip vulnerability factor) and at the SSD level (e.g., SSD vulnerability factor). The vulnerability factor of a flash chip is defined as the sum of the vulnerability factors of each block in the flash chip, as demonstrated below:

$$\text{CHIP\_VUL\_FACTOR} = \Sigma_{i=1}^{N} \text{VulnerabilityFactor}_i$$

N: # of blocks in flash chip
VulnerabilityFactor$_i$: vul. Factor of block i
When assigning write requests (i.e. loads) to the flash chips, the firmware determines the target flash chip proportional to: 1/CHIP_VUL_FACTOR. Therefore, a flash chip with a higher number of vulnerable/failed blocks can get less requests.

Similarly, the vulnerability factor of an SSD can be defined as the sum of the chip vulnerability factors of each flash chip in the SSD, as demonstrated below:

$$\text{SSD\_VUL\_FACTOR} = \Sigma_{i=1}^{K} \text{CHIP\_VUL\_FACTOR}_i$$

K: # of flash chips inside SSD
When assigning loads to each SSD, the loads are assigned to SSDs according to the SSD vulnerability factors. For example, the load can be assigned to the SSD with the smallest SSD vulnerability factor.

Figure 5:
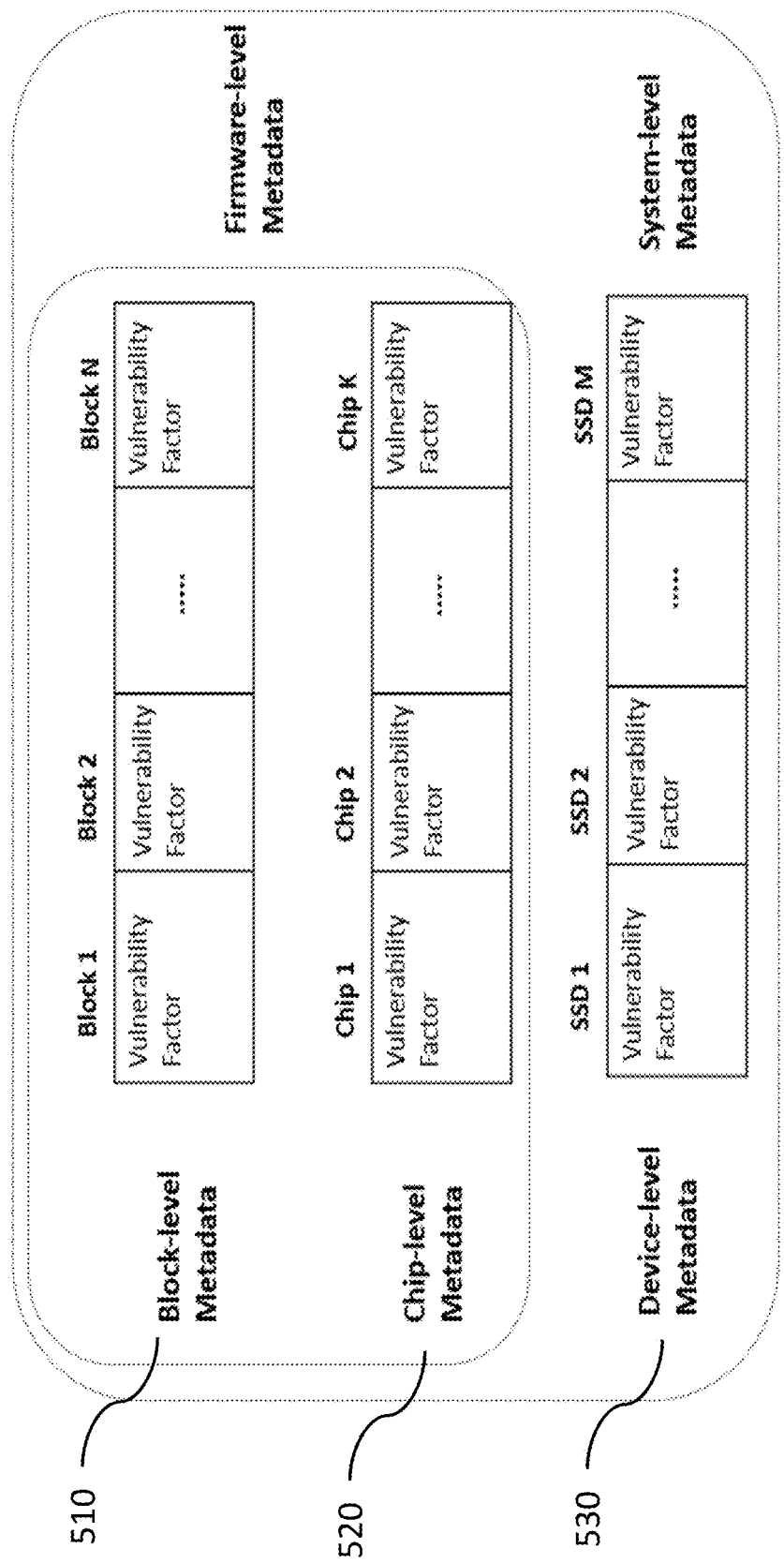
FIG. 5 is a chart showing metadata that is tracked at the block level, chip level, and device level, in accordance with example embodiments of the disclosure.

FIG. 5 is a chart showing metadata that is tracked at the block level, chip level, and device level, in accordance with example embodiments of the disclosure.

Referring to FIG. 5, the device firmware maintains the block level metadata 510 and the chip level metadata 520. The device level metadata 530 is maintained at the system level. The block level metadata 510 may include the vulnerability factor of each individual block. The chip-level metadata 520 may include the vulnerable factor of each individual flash chip. The device-level metadata 530 may include the vulnerability factor of each individual SSD in the system.

Thus, as illustrated in FIG. 5, because block level, chip level, and device level metadata may each be maintained, embodiments of the present disclosure may be implemented at various levels of abstraction (e.g., at the block-level, at the chip level, or at the device (i.e., individual SSD) level. For example, the vulnerability factor of each flash chip can be calculated. The chip vulnerability factor can be defined as the sum of the vulnerability factors of each block within the chip. In some embodiments, workload may be directed to the flash chips according to the vulnerability factors of the chips.

In addition, vulnerability factors of each SSD may also be calculated. The SSD vulnerability factor can be defined as the sum of the vulnerability factors of each chip within the SSD. In some embodiments, workload may be directed to the SSDs according to the vulnerability factors of the SSDs.

Further, vulnerability factors of each page within a block may also be calculated. In some embodiments, workload may be directed to the pages according to the vulnerability factors of the pages.

FIG. 6 is a flowchart showing a method for distributing load across memory devices within a memory system, in accordance with example embodiments of the disclosure. According to some example embodiments, the number and order of operations illustrated in FIG. 6 may vary. For example, according to some example embodiments, there may be fewer or additional operations, unless otherwise stated or implied to the contrary. Additionally, the order of the operations may vary, unless otherwise stated or implied to the contrary. In some embodiments, the operations illustrated in FIG. 6 may be implemented using any suitable firmware.

Referring to FIG. 6, a memory system can receive a request to write data to a memory device in 610. In various embodiments, the memory devices may include a page, a block, a flash chip, or a SSD. In 620, a controller (i.e. firmware) can calculate the vulnerability factor of each memory device in the memory system. In some embodiments, the vulnerability factor of a block can be calculated using a failure prediction module. In some embodiments, the vulnerability factor of a flash chip can be equal to the sum of the vulnerability factors of the blocks in the flash chip. In some embodiments, the vulnerability factor of a SSD can be equal to the sum of the vulnerability factors of the flash chips in the SSD.

In 630, a memory device can be selected for writing the data according to the vulnerability factor of the memory device. In some embodiments, the memory device with the smallest vulnerability factor (i.e. the least vulnerable memory device) can be selected for writing the data. In 640, the write data request can be directed to the selected memory device.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like.

Features of the inventive concept and methods of accomplishing the same may be understood more readily by reference to the aforementioned detailed description of embodiments and the accompanying drawings. The aforesaid embodiments were described in more detail with reference to the accompanying drawings, in which like reference numbers referred to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of embodiments of the present disclosure may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the previous description, for the purposes of explanation, numerous specific details were set forth to provide a thorough understanding of various embodiments. It is apparent, however, that various embodiments may be practiced without these specific details or with one or more equivalent arrangements. Further, one of ordinary skills in the art would appreciate that various features of two or more embodiments described herein may be combined in any suitable manner without departing from the spirit or scope of the present disclosure. In other instances, well-known structures and devices are shown in block diagram form in order to avoid unnecessarily obscuring various embodiments.

It is understood that when an element, layer, region, or component was referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it is understood that when an element or layer was referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicated otherwise. It is further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within 30%, 20%, 10%, 5% of the stated value. Further, the use of "may" when describing embodiments of the disclosure refers to "one or more embodiments of the disclosure." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A method for dynamic wear-levelling and load redirection in a solid-state drive (SSD) comprising one or more blocks, the method comprising:
   receiving, by a controller, a request to write data;
   calculating, by the controller, a vulnerability factor of a block of the SSD, wherein the vulnerability factor is calculated using a first parameter generated from first metadata associated with a first memory device level and a second parameter generated from second metadata associated with a second memory device level;
   selecting, by the controller, the block as a target block to receive the request to write data;
   determining, by the controller, a status of the target block based on the vulnerability factor of the target block;
   writing, by the controller, the data to the target block based on the status of the target block; and
   updating, by the controller, a mapping table based on the data written to the target block.

2. The method according to claim 1, further comprising writing, by the controller, the data to a replica block when the vulnerability factor of the target block is greater than a predetermined threshold.

3. The method according to claim 1, wherein the status comprises at least one of a healthy status, a vulnerable status, or a retired status.

4. The method according to claim 1, wherein the mapping table comprises a table that maps a logical page number of the data written to the target block to a physical page number of the data written to the target block.

5. The method according to claim 1, wherein the target block is selected based on the vulnerability factor of the target block.

6. The method according to claim 5, wherein the target block with a smallest vulnerability factor is selected.

7. The method according to claim 1, wherein the vulnerability factor is calculated using a first set of parameters generated from block level metadata and a second set of parameters generated from drive level metadata.

8. The method according to claim 7, wherein the block level metadata comprises at least one of a read error, a write error, or an erase error.

9. The method according to claim 7, wherein the drive level metadata comprises one or more of a page identification, a block identification, a timestamp, a block-based error, and a drive log data.

10. A solid-state drive (SSD) system comprising a controller and one or more blocks, wherein the controller is configured to:
    receive a request to write data;
    calculate a vulnerability factor of a block of the SSD, wherein the vulnerability factor is calculated using a first parameter generated from first metadata associated with a first memory device level and a second parameter generated from second metadata associated with a second memory device level;
    select the block as a target block to receive the request to write data;
    determine a status of the target block based on the vulnerability factor of the target block;
    write the data to the target block based on the status of the target block; and
    update a mapping table based on the data written to the target block.

11. The system according to claim 10, wherein the controller is further configured to:
    write the data to a replica block when the vulnerability factor of the target block is greater than a predetermined threshold.

12. The system according to claim 10, wherein the status comprises at least one of a healthy status, a vulnerable status, and a retired status.

13. The system according to claim 10, wherein the target block is selected based on the vulnerability factor of the target block.

14. The system according to claim 13, wherein the target block with a smallest vulnerability factor is selected.

15. The system according to claim 10, wherein the vulnerability factor is calculated using a first set of parameters generated from block level metadata and a second set of parameters generated from drive level metadata.

16. The system according to claim 15, wherein the block level metadata comprises at least one of a read error, a write error, or an erase error.

17. The system according to claim 15, wherein the drive level metadata comprises one or more of a page identification, a block identification, a timestamp, a block-based error, and a drive log data.

18. A method for dynamic wear-levelling and load redirection within a memory system comprising one or more memory devices, the method comprising:
   receiving, by a controller, a request to write data;
   calculating, by the controller, a vulnerability factor of a memory device, wherein the vulnerability factor is calculated using a first parameter generated from first metadata associated with a first memory device level and a second parameter generated from second metadata associated with a second memory device level;
   selecting, by the controller, the memory device as a target device to receive the request to write data based on the vulnerability factor of the target device; and
   directing, by the controller, the request to write data to the target device.

19. The method according to claim 18, wherein the memory device comprises a flash chip.

20. The method according to claim 19, wherein the vulnerability factor of the flash chip is equal to a sum of all blocks within the flash chip.

21. The method according to claim 19, wherein a flash chip with a smallest vulnerability factor is selected as a target flash chip.

22. The method according to claim 18, wherein the memory device comprises an SSD.

23. The method according to claim 22, wherein the vulnerability factor of the SSD is equal to a sum of all flash chips within the SSD.

24. The method according to claim 22, wherein an SSD with a smallest vulnerability factor is selected as a target SSD.

* * * * *